(12) United States Patent
Chen et al.

(10) Patent No.: US 12,331,726 B1
(45) Date of Patent: Jun. 17, 2025

(54) DUST CLEANING DEVICE FOR WIND TURBINE BLADE

(71) Applicant: YANTAI POWER PLANT OF HUANENG SHANDONG POWER GENERATION CO., LTD., Yantai (CN)

(72) Inventors: Wei Chen, Yantai (CN); Qingjian You, Yantai (CN); Qiwei Zhang, Yantai (CN); Han Xu, Yantai (CN); Xin Jiang, Yantai (CN); Yan Xing, Yantai (CN); Xiaole Tian, Yantai (CN)

(73) Assignee: YANTAI POWER PLANT OF HUANENG SHANDONG POWER GENERATION CO., LTD., Yantai (CN)

( * ) Notice: Subject to any disclaimer, the term of this patent is extended or adjusted under 35 U.S.C. 154(b) by 0 days.

(21) Appl. No.: 19/060,135

(22) Filed: Feb. 21, 2025

(30) Foreign Application Priority Data

Feb. 28, 2024 (CN) .......................... 202410223886.X

(51) Int. Cl.
*F03D 80/55* (2016.01)
(52) U.S. Cl.
CPC .................................... *F03D 80/55* (2016.05)
(58) Field of Classification Search
None
See application file for complete search history.

(56) References Cited

U.S. PATENT DOCUMENTS

2022/0355343 A1* 11/2022 Bentley ...................... B08B 1/30
2025/0073758 A1* 3/2025 Putrams ................... F03D 80/55

FOREIGN PATENT DOCUMENTS

| CN | 110107464 A | 8/2019 |
| CN | 117463734 A | 1/2024 |
| DE | 202022101952 U1 | 6/2022 |
| WO | 2021121523 A | 6/2021 |
| WO | WO-2021121523 A1 * | 6/2021 |

(Continued)

OTHER PUBLICATIONS

DE 202022101952 U1 Espacenet translation, Cleaning and Maintenance Device for the Inside of the Hub in the Nacelle of Wind Turbines (Year: 2022).*

(Continued)

*Primary Examiner* — Cristi J Tate-Sims
(74) *Attorney, Agent, or Firm* — Ming Jiang; OPENPTO US LLC

(57) ABSTRACT

A dust cleaning device for wind turbine blades is provided and relates to the technical field of wind power generation equipment. The device includes a main body plate frame, suction wheel mounting frames are installed on both sides of a bottom of the main body plate frame, negative pressure soft rubber suction wheels are installed on each of the suction wheel mounting frames, and the main body plate frame is provided with a first vision sensor, an air compressor is installed on the main body plate frame, the main body plate frame is installed with a plurality of threaded connecting pipes, the threaded connecting pipes are used for connecting with a cleaning nozzle, a plurality of intelligent cleaning disks and a blade dustproof maintenance assembly are installed at the bottom of the main body plate frame.

7 Claims, 11 Drawing Sheets

(56) References Cited

FOREIGN PATENT DOCUMENTS

WO     WO-2022063369 A1 * 3/2022

OTHER PUBLICATIONS

DE 10333628 A1 machine translation, Cleaning Device for Cleaning a Wind Power Plant's Elongated Rotor Wings Fitted Above the Earth's Surface Has a Bogie, Supporting Elements With a Cantilever Arm and a Rotary Brush, Buss (Year: 2005).*
CN 112756291 A machine translation, Intelligent Mechanical Device for Cleaning Blade of Wind Driven Generator, Ye (Year: 2021).*

* cited by examiner

DUST CLEANING DEVICE FOR WIND TURBINE BLADE

CROSS-REFERENCE TO RELATED APPLICATIONS

This application claims priority of Chinese Patent Application No. 202410223886.X, filed on Feb. 28, 2024, the content of which is hereby incorporated by reference.

TECHNICAL FIELD

The disclosure relates to the technical field of wind power generation equipment, and particularly relates to a dust cleaning device for wind turbine blades.

BACKGROUND

A wind turbine is a device that converts wind energy into electric energy, which includes a wind wheel, a transmission, a generator, a control system, etc. The wind wheel usually includes a plurality of blades. When the wind passes through the blades, the blades will rotate under the action of wind pressure, thus driving the generator to generate electric energy.

When the wind turbine runs for a period of time, it is easy to accumulate dust, dust and other particles on the blade surface, which will increase the roughness of the blade surface and cause the airflow to generate more turbulence on the blade, thus reducing the conversion efficiency of wind energy, meanwhile, the dust accumulated on the blade surface will cause imbalance, resulting in additional vibration of the wind turbine during operation. These vibrations will not only increase the wear of mechanical parts, but also produce noise, which has adverse effects on equipment and environment. Regular dust cleaning is helpful to keep smooth and flat of the blade surface, and reduce the corrosion and wear of particles, which can prolong the service life of blades, reduce the frequency of maintenance and replacement, and improve the reliability and economy of wind turbines.

Manual cleaning is usually used for dust cleaning of the wind turbine blades. When cleaning the wind turbine blades at high altitude, workers need to climb the wind turbine tower or use lifting equipment, which has certain risks of working at high altitude. At the same time, manual cleaning is limited by the skills and resources of operators, which cannot guarantee the thoroughness of cleaning. Meanwhile, due to the high risk, manual dust cleaning usually only cleans the blades without dustproof maintenance.

SUMMARY

The disclosure provides a dust cleaning device for wind turbine blades, which is used for solving at least one technical problem mentioned above.

In order to solve the technical problems, the disclosure provides a dust cleaning device for wind turbine blades, which includes a main body plate frame, where suction wheel mounting frames are installed on both sides of a bottom of the main body plate frame, negative pressure soft rubber suction wheels are installed on each of the suction wheel mounting frames, and the main body plate frame is provided with a first vision sensor and the first vision sensor is electrically connected with each of the negative pressure soft rubber suction wheels, an air compressor is installed on the main body plate frame, a front side of the main body plate frame is installed with a plurality of threaded connecting pipes, the threaded connecting pipes are used for connecting with a cleaning nozzle, one end, away from the cleaning nozzle, of each of the threaded connecting pipes is communicated with an output end of the air compressor, a plurality of intelligent cleaning disks and a blade dustproof maintenance assembly are installed at the bottom of the main body plate frame, and an intelligent mechanical arm is installed at a top of the main body plate frame.

Preferably, a working end of the intelligent mechanical arm is provided with a preliminary surface cleaning assembly, the preliminary surface cleaning assembly is used for preliminary dust cleaning for wind turbine blades.

Preferably, the preliminary surface cleaning assembly includes a dust suction pipe, where a dust suction head is arranged at an inlet of the dust suction pipe, a negative pressure fan is arranged at an outlet of the dust suction pipe, and a middle of the dust suction pipe is threadedly connected with a first storage bin and a funnel in turn along a dust inlet direction; a first filter screen is fixedly connected on an inner wall, above the first storage bin, of the dust suction pipe, and a second filter screen is fixedly connected at one end, close to the negative pressure fan, in the dust suction pipe; a bottom of the funnel is threadedly connected with a temporary storage pipe, the temporary storage pipe is provided with a manipulator groove, and a second storage bin is fixedly connected below the temporary storage pipe;

the second storage bin is fixedly connected with an extrusion cylinder, an output end of the extrusion cylinder is fixedly connected with an extrusion plate, the second storage bin is fixedly connected with two symmetrically arranged cover opening control cylinders, and an output end of each of the cover opening control cylinders is fixedly connected with a cover opening.

Preferably, a temporary storage assembly is arranged in the temporary storage pipe, and the temporary storage assembly includes an electric baffle and a limit block, where the electric baffle is rotatably connected to an inner wall of the temporary storage pipe, and the limit block is fixedly connected to the inner wall of the temporary storage pipe; the electric baffle is provided with a pressure sensor, a timer and a controller, an abutting cylinder is arranged in the electric baffle, and the controller is electrically connected with the pressure sensor, the timer, the electric baffle and the abutting cylinder;

when $F_1 < F_S \leq F_2$, the abutting cylinder is in an extended state, and a plane of the electric baffle is in a state perpendicular to an axis of the temporary storage pipe;

when $F_S > F_2$, the abutting cylinder is shortened, and the plane of the electric baffle is simultaneously triggered to rotate to a state parallel to the axis of the temporary storage pipe, and the electric baffle is reset after staying for a preset time;

where $F_1$ is a first pressure threshold, $F_2$ is a second pressure threshold, $F_S$ is a detection value of the pressure sensor, and the preset time is a timing value of the timer.

Preferably, the cleaning nozzle includes a cleaning nozzle main body, a guide cylinder is fixedly connected in the cleaning nozzle main body, a pneumatic piston is slidably connected in the guide cylinder, a reset elastic piece is sleeved on the pneumatic piston, and one end of the pneumatic piston is fixedly connected with a sealing plug, an other end of the pneumatic piston is fixedly connected with an ejector rod, the guide cylinder is provided with a plurality of pressurized through holes, and an output end of the cleaning nozzle main body is fixedly connected with a rubber folding piece, one end, away from the pneumatic piston, of the ejector rod is fixedly connected to the rubber folding piece.

Preferably, the intelligent cleaning disks are fixedly connected with a height adjusting piece, and one end, away from the intelligent cleaning disks, of the height adjusting piece is rotatably connected to the bottom of the main body plate frame;

each of the intelligent cleaning disks includes a cleaning disk shell, where a second vision sensor is installed on the cleaning disk shell, a universal wheel and two symmetrically arranged auxiliary wheels are installed at a bottom of the cleaning disk shell, and a centralized brush head and a collection brush head are rotatably connected to the bottom of the cleaning disk shell, the collection brush head is rotatably connected in a collection cavity.

Preferably, the blade dustproof maintenance assembly includes a dustproof maintenance driving motor, the dustproof maintenance driving motor is fixedly connected to the bottom of the main body plate frame, two output ends of the dustproof maintenance driving motor are fixedly connected with a first bevel gear and a second bevel gear respectively, and two symmetrically arranged first dustproof maintenance lead screws are rotatably connected in the main body plate frame; a third bevel gear is fixedly connected to each of the first dustproof maintenance lead screws, and the third bevel gear and the first bevel gear are meshed with each other; each of the first dustproof maintenance lead screws is threadedly connected with a shifting nut, and the shifting nut is fixedly connected with a wedge-shaped block; abutting rods are slidably connected in the main body plate frame, the main body plate frame is rotatably connected with hollow swing rods, one end of each of the abutting rods abuts against the wedge-shaped block, and an other end of each of the abutting rods is hinged with a linkage slider, the linkage slider is slidably connected with each of the hollow swing rods, and each of the abutting rods is connected with the main body plate frame through a connecting elastic piece;

two symmetrically arranged second dustproof maintenance lead screws are rotatably connected in the main body plate frame, and a fourth bevel gear is fixedly connected to each of the second dustproof maintenance lead screws, and the fourth bevel gear and the second bevel gear are meshed with each other, and one end, away from the fourth bevel gear, of each of the second dustproof maintenance lead screws is located in a dustproof maintenance liquid extrusion cavity, each of the second dustproof maintenance lead screws is threadedly connected with an extrusion piston, and an outlet end of the dustproof maintenance liquid extrusion cavity is communicated with each of the hollow swing rods through a hose, a retractable sponge layer is installed on each of the hollow swing rods.

Preferably, the main body plate frame is bolted with a spare part storage box, the spare part storage box is used for storing spare parts.

Preferably, a negative pressure fan, an airflow channel, a filtering assembly and an impurity removing assembly are arranged in each of the negative pressure soft rubber suction wheels, the filtering assembly and the impurity removing assembly are arranged in the airflow channel, the negative pressure fan is used for generating negative pressure, the filtering assembly is used for filtering dust impurities in airflow, and the impurity removing assembly is used for discharging filtered dust impurities, and air flows along the airflow channel under an action of the negative pressure fan to form a negative pressure circulating airflow to ensure the negative pressure soft rubber suction wheels stably travelling on blades.

Preferably, the device further includes a negative pressure soft rubber suction wheel control system, where the negative pressure soft rubber suction wheel control system is used for controlling the negative pressure soft rubber suction wheels to work, and the negative pressure soft rubber suction wheel control system includes:

a density sensor, where the density sensor is arranged in the airflow channel and is used for detecting density of dust impurities in the airflow channel;

a flow rate sensor, where the flow rate sensor is arranged in the airflow channel and is used for detecting flow rate of airflow in the airflow channel;

a flow sensor, where the flow sensor is arranged in the airflow channel and is used for detecting flow of airflow in the airflow channel;

an angular velocity sensor, where the angular velocity sensor is arranged on the negative pressure fan and is used for detecting angular velocity of the negative pressure fan;

a control unit and a blocking alarm unit, where the control unit is electrically connected with the density sensor, the flow rate sensor, the flow sensor, the angular velocity sensor, the negative pressure fan and the blocking alarm unit, and the control unit controls rotation speed of the negative pressure fan and operation of the blocking alarm unit based on the density sensor, the flow rate sensor, the flow sensor and the angular velocity sensor, including following steps:

step 1: based on the density sensor, the flow rate sensor and the flow sensor, calculating a real-time blocking degree coefficient of the airflow channel:

$$\beta = \frac{\sum_{i=1}^{t} \gamma_i * \vartheta^2 * A}{F_0 |P_1 - P_2|^{\frac{L}{D}}} \varphi * \alpha; \tag{1}$$

where $\beta$ is the real-time blocking degree coefficient of the airflow channel, $\gamma_i$ represents a detection value of the density sensor in i-th density detection period, t represents a total working time, T represents a density detection period, $\vartheta$ is a detection value of the flow rate sensor, A is an inner wall area of the airflow channel, L is a channel length of the airflow channel, D is an average diameter of the airflow channel, $F_0$ is a reference resistance of the airflow channel, $P_1$ represents an inlet air pressure of the airflow channel, $P_2$ represents an outlet air pressure of the airflow channel, $\varphi$ is a detection value of the flow sensor and a is a flow resistance of the filtering assembly;

step 2: calculating angular velocity of the negative pressure fan at j-th moment based on step 1, the angular velocity sensor and formula (2):

$$\omega_j = \frac{\omega_{j-1} \beta \left[ \left( \frac{P_1}{P_2} \right)^{\frac{m}{m-1}} - 1 \right]}{\eta}; \tag{2}$$

where, $\omega_j$ is an angular velocity of the negative pressure fan at j-th moment, m is a variable index of the negative pressure fan, $\omega_{j-1}$ is an angular velocity of the negative pressure fan at j−1-th moment, and η is a variable efficiency of the negative pressure fan;

step 3: comparing the real-time blocking degree coefficient of the airflow channel with a reference blocking degree coefficient of the airflow channel by the control unit, where if the real-time blocking degree coefficient of the airflow channel is greater than the reference blocking degree coefficient of the airflow channel, the control unit controls the blocking alarm unit to give an alarm, and the impurity removing assembly is started to remove impurities, and meanwhile, the controller performs real-time regulation and control on acceleration of the negative pressure fan based on the angular velocity of the negative pressure fan at j-th moment.

Compared with the prior art, the disclosure has the following beneficial effects.

The disclosure solves the technical problems that the dust cleaning of wind turbine blades usually adopts a manual cleaning mode, when cleaning the wind turbine blades at high altitude, workers need to climb the wind turbine tower or use lifting equipment, which has a certain risk of working at high altitude; meanwhile, manual cleaning is limited by the skills and resources of the operators, so that the thoroughness of cleaning cannot be guaranteed; and at the same time, due to the high risk, manual dust cleaning usually only performs dust cleaning on the blades without dustproof maintenance.

BRIEF DESCRIPTION OF THE DRAWINGS

The accompanying drawings are provided to provide a further understanding of the disclosure and constitute a part of the description. Together with the embodiments of the disclosure, they serve to explain the disclosure and do not constitute a limitation of the disclosure. In the attached drawings.

Figure 1:
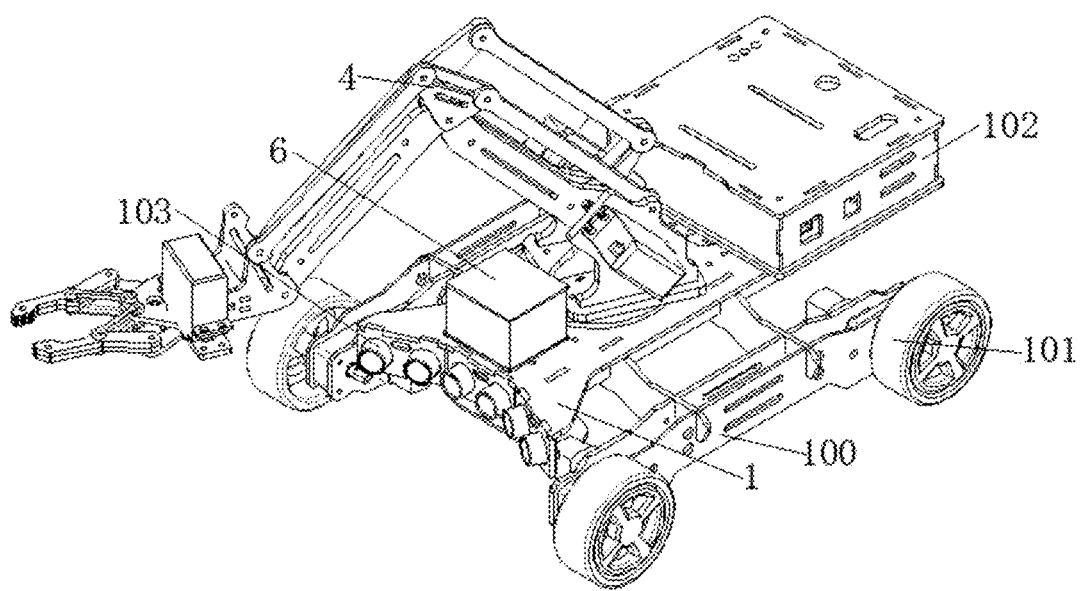
FIG. 1 is a schematic diagram of the overall structure of the dust cleaning device according to the disclosure.

List of reference characters: 1 main body plate frame; 100 suction wheel mounting frame; 101 negative pressure soft rubber suction wheel; 102 air compressor; 103 threaded connecting pipe; 104 cleaning nozzle; 1040 cleaning nozzle main body; 1041 guide cylinder; 1042 pneumatic piston; 1043 reset elastic piece; 1044 sealing plug; 1045 ejector rod; 1046 pressurized through hole; 1047 rubber folding piece; 2 intelligent cleaning disk; 200 height adjusting piece; 201 cleaning disk shell; 202 universal wheel; 203 auxiliary wheel; 204 concentrated brush head; 205 collection brush head; 206 collection cavity; 3 blade dustproof maintenance assembly; 300 dustproof maintenance drive motor; 3000 first bevel gear; 3001 second bevel gear; 3002 first dustproof maintenance lead screw; 3003 third bevel gear; 3004 shifting nut; 3005 linkage slider; 3006 wedge-shaped block; 3007 abutting rod; 3008 hollow swing rod; 3009 connecting elastic piece; 301 second dustproof maintenance lead screw; 3010 fourth bevel gear; 3011 dustproof maintenance liquid extrusion cavity; 3012 extrusion piston; 3013 hose; 3014 retractable sponge layer; 4 intelligent mechanical arm; 5 preliminary surface cleaning assembly; 500 dust suction pipe; 5000 first filter screen; 5001 second filter screen; 501 first storage bin; 502 funnel; 503 dust suction head; 504 negative pressure fan; 505 temporary storage pipe; 5050 manipulator groove; 5051 electric baffle; 5052 limit block; 5053 abutting cylinder; 506 second storage bin; 507 extrusion cylinder; 508 extrusion plate; 509 cover opening control cylinder; 5090 cover opening; and 6 spare part storage box.

DETAILED DESCRIPTION OF THE EMBODIMENTS

Preferred embodiments of the disclosure will be described below with reference to the accompanying drawings, and it should be understood that the preferred embodiments described here are only used to illustrate and explain the disclosure, and are not used to limit the disclosure.

In addition, in the disclosure, descriptions such as "first" and "second" are only used for description purposes, and do not specifically refer to the order or sequence, nor are they used to limit the disclosure. They are only used to distinguish assemblies or operations described in the same technical terms, and cannot be understood as indicating or implying their relative importance or implicitly indicating the number of indicated technical features. Therefore, the features defined as "first" and "second" can explicitly or implicitly include at least one of these features. In addition, the technical solutions and technical features of each embodiment can be combined with each other, but they must be based on the realization of ordinary skilled in the field. When the combination of technical solutions is contradictory or impossible, it should be considered that the combination of technical solutions does not exist and is not within the scope of protection required by the disclosure.

The disclosure provides the following embodiments.

Embodiment 1

Figure 2:
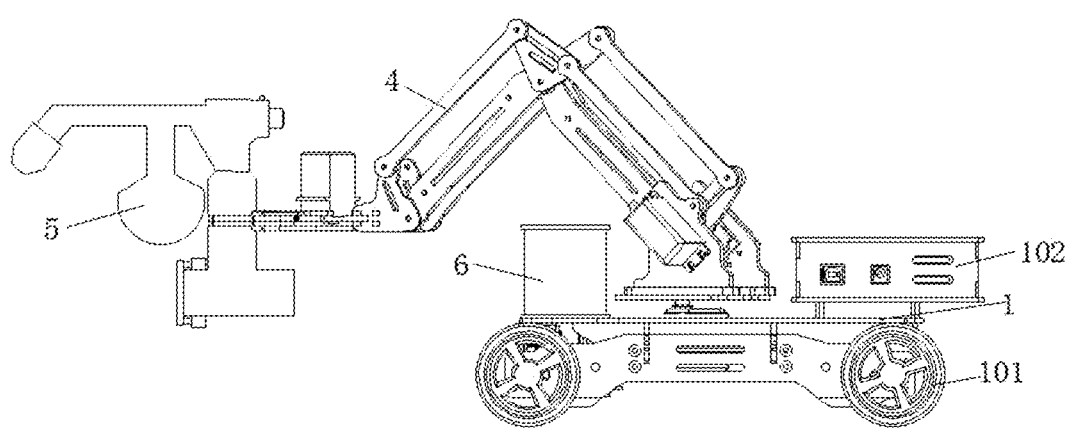
FIG. 2 is a side view of the dust cleaning device according to the disclosure.
Figure 3:
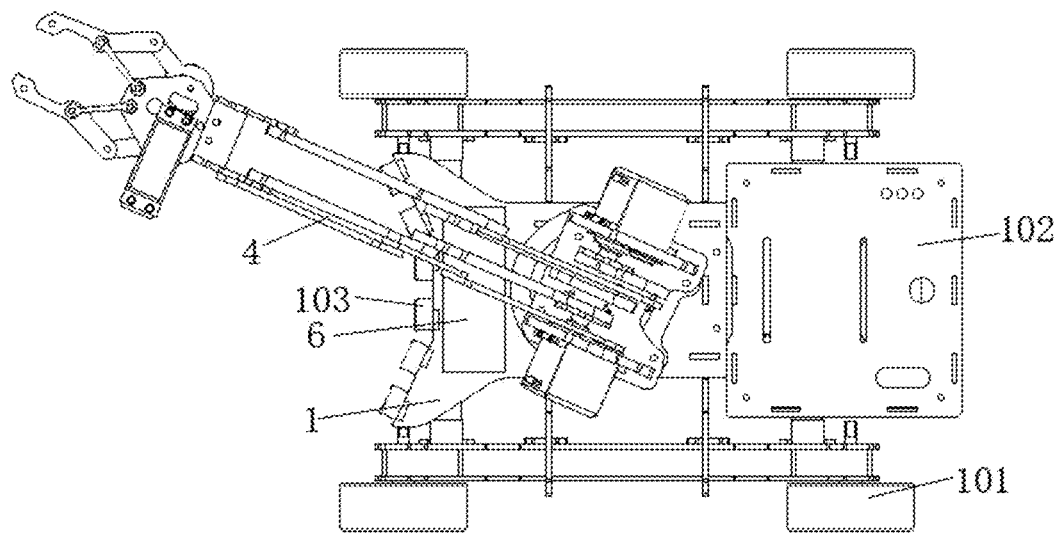
FIG. 3 is a top view of the dust cleaning device according to the disclosure.
Figure 4:
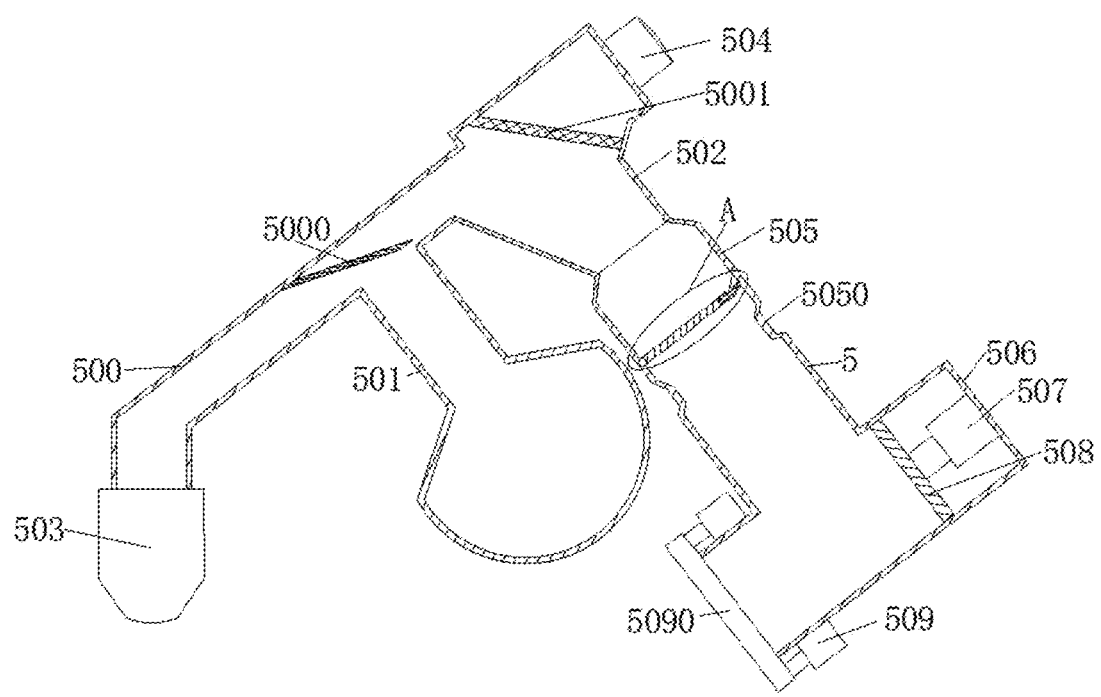
FIG. 4 is a schematic structural diagram of a preliminary surface cleaning assembly according to the disclosure.
Figure 5:
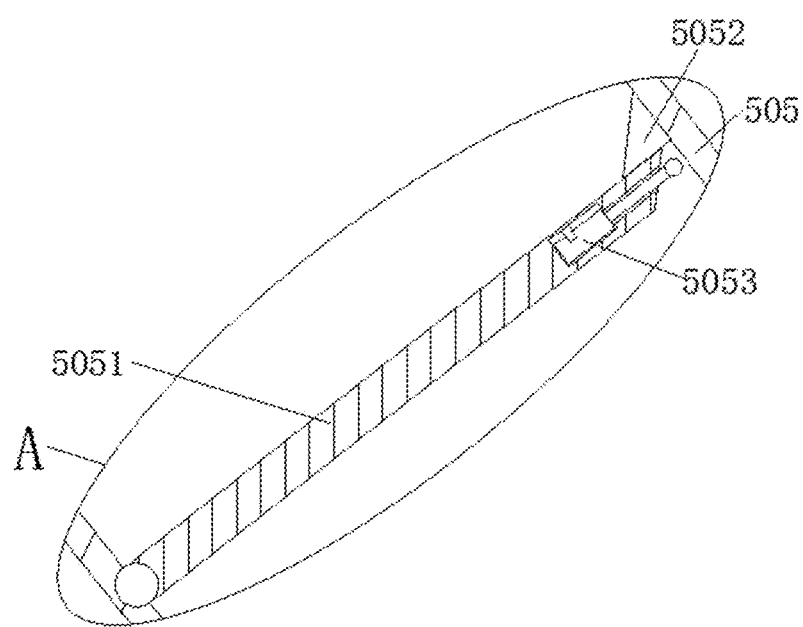
FIG. 5 is a partial enlarged diagram at A of FIG. 4 according to the disclosure.
Figure 6:
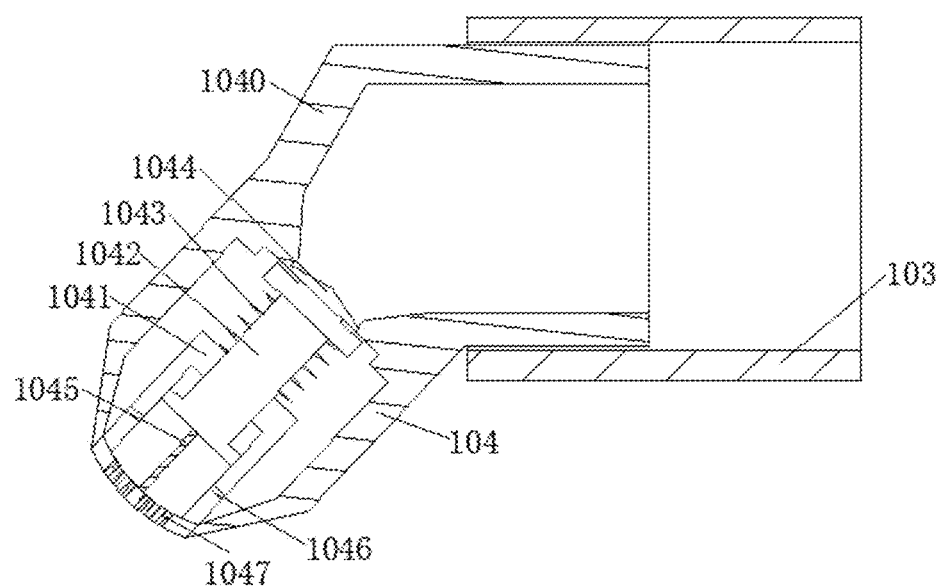
FIG. 6 is a schematic structural diagram of the cleaning nozzle according to the disclosure.
Figure 7:
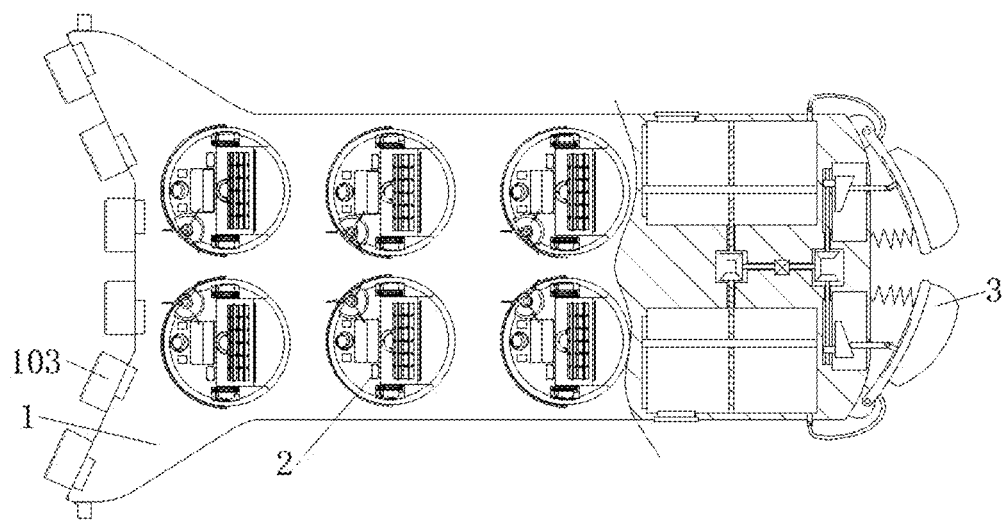
FIG. 7 is a schematic structural diagram of the bottom of the main body plate frame according to the disclosure.
Figure 8:
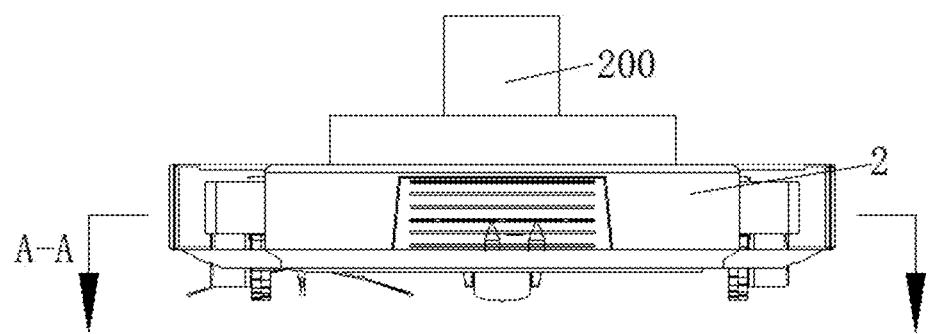
FIG. 8 is a schematic diagram of the side structure of the intelligent cleaning disk according to the disclosure.
Figure 9:
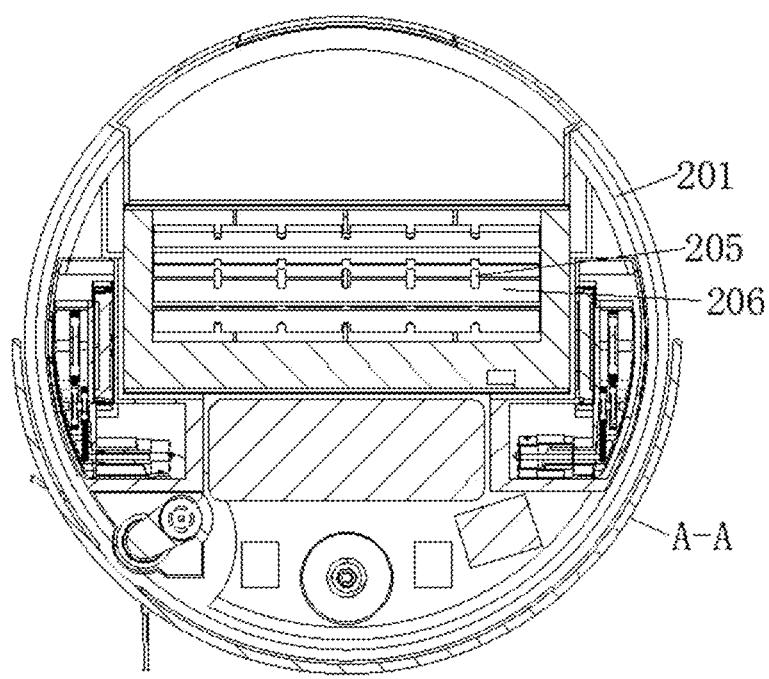
FIG. 9 is a sectional diagram of the intelligent cleaning disk according to the disclosure.
Figure 10:
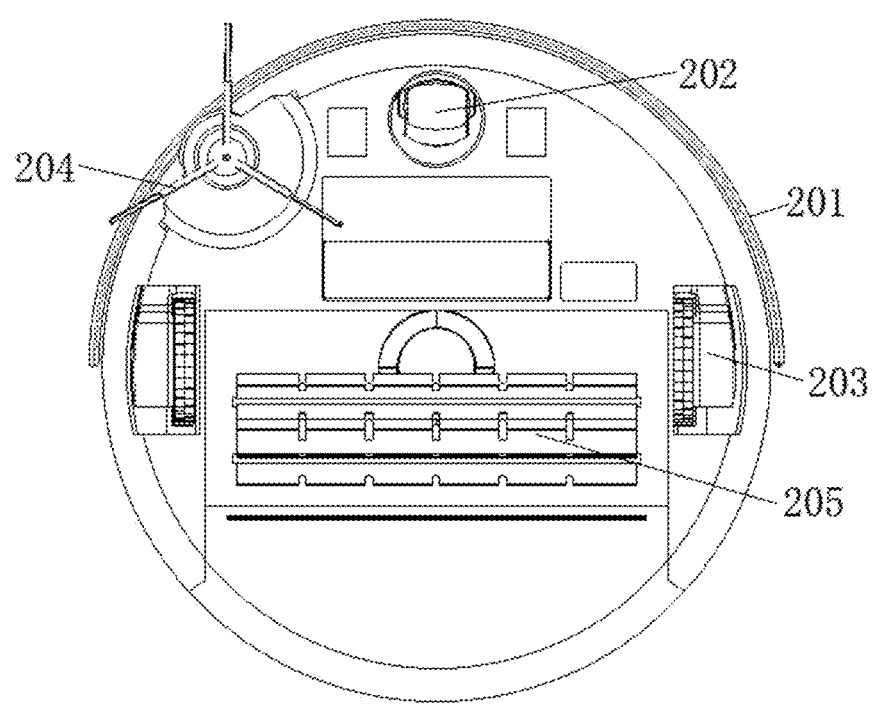
FIG. 10 is a schematic diagram of the bottom of the intelligent cleaning disk according to the disclosure.
Figure 11:
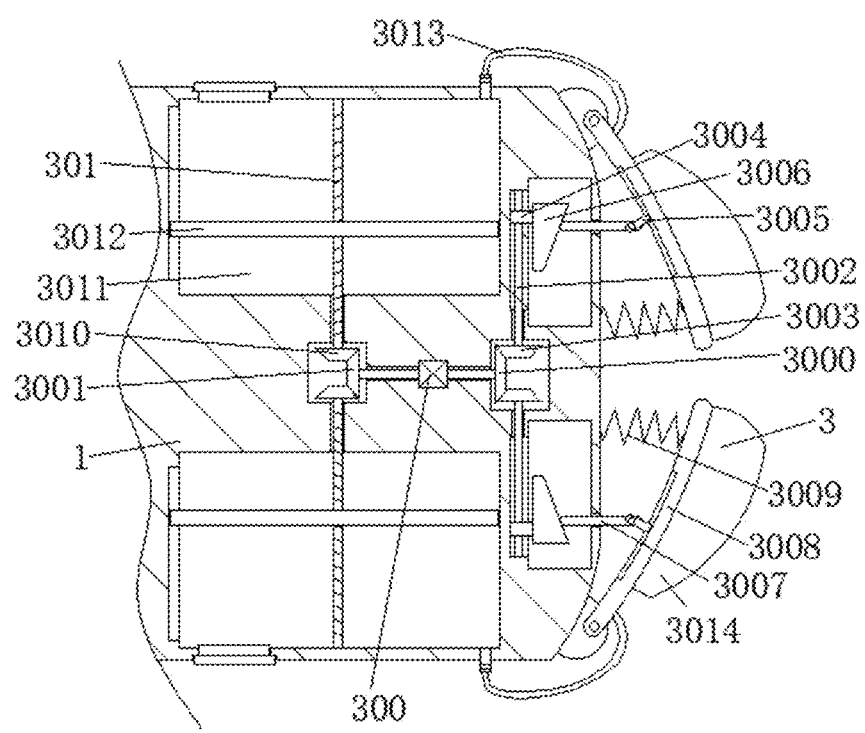
FIG. 11 is a schematic structural diagram of the blade dustproof maintenance assembly according to the disclosure.

The embodiment of the disclosure provides a dust cleaning device for wind turbine blades, as shown in FIGS. 1-11, which includes a main body plate frame 1, suction wheel mounting frames 100 are installed on both sides of a bottom of the main body plate frame 1, negative pressure soft rubber suction wheels 101 are installed on each of the suction wheel mounting frames 100, and the main body plate frame 1 is provided with a first vision sensor and the first vision sensor is electrically connected with each of the negative pressure soft rubber suction wheels 101, an air compressor 102 is installed on the main body plate frame 1, a front side of the main body plate frame 1 is installed with a plurality of threaded connecting pipes 103, the threaded connecting pipes 103 are used for connecting with a cleaning nozzle 104, one end, away from the cleaning nozzle 104, of each of the threaded connecting pipes 103 is communicated with an output end of the air compressor 102, a plurality of intelligent cleaning disks 2 and a blade dustproof maintenance assembly 3 are installed at the bottom of the main body plate frame 1, and an intelligent mechanical arm 4 is installed at a top of the main body plate frame 1.

Preferably, the main body plate frame 1 is bolted with a spare part storage box 6, the spare part storage box 6 is used for storing spare parts.

The working principle and beneficial effects of the technical scheme are as follows: when in use, the dust cleaning device is hoisted on the wind turbine blade through the hanger, so that the negative pressure soft rubber suction wheel 101 contacts with the surface of the wind turbine blade, and the negative pressure soft rubber suction wheel 101 can not only ensure the normal running of the dust cleaning device but also ensure that the dust cleaning device is tightly attached to the surface of the wind turbine blade, and the traveling direction of the dust cleaning device can be controlled through the first visual sensor. During the traveling of the dust cleaning device, firstly, the dust on the surface of the wind turbine blade is preliminarily collected by the preliminary surface cleaning assembly 5 to remove most of the dust on the surface of the wind turbine blade, so as to avoid that a large amount of dust flutters and falls on the blade again, which leads to the ineffectiveness of dust cleaning the blade. Then, the air compressor 102 starts to blow the surface of the wind turbine blade through the cleaning nozzle 104, and after blowing, the surface of the wind turbine blade is deeply swept through the intelligent cleaning disk 2. Finally, dustproof maintenance liquid is coated on the surface of the wind turbine blade through the blade dustproof maintenance assembly 3, and the dustproof maintenance liquid forms a protective film on the surface of the wind turbine blade, which can increase the smoothness of the blade surface, reduce the adhesion of dust and pollutants, and reduce the frequency of blade cleaning and maintenance.

The disclosure solves the technical problems that the dust cleaning of wind turbine blades usually adopts a manual cleaning mode, when cleaning the wind turbine blades at high altitude, workers need to climb the wind turbine tower or use lifting equipment, which has a certain risk of working at high altitude; meanwhile, manual cleaning is limited by the skills and resources of the operators, so that the thoroughness of cleaning cannot be guaranteed; and at the same time, due to the high risk, manual dust cleaning usually only performs dust cleaning on the blades without dustproof maintenance.

Embodiment 2

On the basis of Embodiment 1, a working end of the intelligent mechanical arm 4 is provided with a preliminary surface cleaning assembly 5, the preliminary surface cleaning assembly 5 is used for preliminary dust cleaning for wind turbine blades;
the preliminary surface cleaning assembly 5 includes a dust suction pipe 500, where a dust suction head 503 is arranged at an inlet of the dust suction pipe 500, a negative pressure fan 504 is arranged at an outlet of the dust suction pipe 500, and a middle of the dust suction pipe 500 is threadedly connected with a first storage bin 501 and a funnel 502 in turn along a dust inlet direction; a first filter screen 5000 is fixedly connected on an inner wall, above the first storage bin 501, of the dust suction pipe 500, and a second filter screen 5001 is fixedly connected at one end, close to the negative pressure fan 504, in the dust suction pipe 500; a bottom of the funnel 502 is threadedly connected with a temporary storage pipe 505, the temporary storage pipe 505 is provided with a manipulator groove 5050, and a second storage bin 506 is fixedly connected below the temporary storage pipe 505;
the second storage bin 506 is fixedly connected with an extrusion cylinder 507, an output end of the extrusion cylinder 507 is fixedly connected with an extrusion plate 508, the second storage bin 506 is fixedly connected with two symmetrically arranged cover opening control cylinders 509, and an output end of each of the cover opening control cylinders 509 is fixedly connected with a cover opening 5090.

The working principle and beneficial effects of the above technical scheme are as follows: when the preliminary surface cleaning assembly 5 works, the working end of the intelligent mechanical arm 4 is clamped on the preliminary surface cleaning assembly 5, and through the traveling of the wind turbine blade dust cleaning device being matched with the movement of the intelligent mechanical arm 4, the dust on the blade surface is collected by the preliminary surface cleaning assembly 5.

When the preliminary surface cleaning assembly 5 works, the negative pressure fan 504 is started to generate negative pressure, and the dust suction head 503 is aligned with the blade surface, and impurities on the blade surface are sucked into the dust suction pipe 500 under the action of the dust suction head 503, when passing through the first filter screen 5000, the larger impurities among the impurities sucked are blocked and fall into the first storage bin 501 under the action of gravity, and the smaller impurities are attached to the second filter screen 5001, and falls into the temporary storage pipe 505 under the action of gravity. When the impurities in the temporary storage pipe 505 accumulate to a certain extent, they continue to fall down into the second storage bin 506. After that, the extrusion cylinder 507 is extended to extrude the impurities falling into the second storage bin 506 and push them to the direction of the cover opening 5090.

Embodiment 3

On the basis of Embodiment 2, a temporary storage assembly is arranged in the temporary storage pipe 505, and the temporary storage assembly includes an electric baffle 5051 and a limit block 5052, where the electric baffle 5051 is rotatably connected to an inner wall of the temporary storage pipe 505, and the limit block 5052 is fixedly connected to the inner wall of the temporary storage pipe 505;
the electric baffle 5051 is provided with a pressure sensor, a timer and a controller, an abutting cylinder 5053 is arranged in the electric baffle 5051, and the controller is electrically connected with the pressure sensor, the timer, the electric baffle 5051 and the abutting cylinder 5053;
when $F_1 < F_S \leq F_2$, the abutting cylinder 5053 is in an extended state, and a plane of the electric baffle 5051 is in a state perpendicular to an axis of the temporary storage pipe 505;
when $F_S > F_2$, the abutting cylinder 5053 is shortened, and the plane of the electric baffle 5051 is simultaneously triggered to rotate to a state parallel to the axis of the temporary storage pipe 505, and the electric baffle 5051 is reset after staying for a preset time;

where $F_1$ is a first pressure threshold, $F_2$ is a second pressure threshold, $F_S$ is a detection value of the pressure sensor, and the preset time is a timing value of the timer.

The working principle and beneficial effects of the above technical scheme are as follows: as impurities on the electric baffle 5051 are continuously accumulated, the detection value of the pressure sensor is continuously increased, until $F_S > F_2$, the abutting cylinder 5053 is shortened, the electric baffle 5051 rotates from the horizontal state to the vertical state, and the impurities on it fall into the second storage bin 506 under the action of gravity. After staying for a preset time, the electric baffle 5051 is reset, and the design of the temporary storage assembly can achieve the effect that the extrusion plate 508 is extruded once every time the material is dropped, and the blocking of the temporary storage pipe 505 can be avoided by batch extrusion.

Embodiment 4

On the basis of Embodiment 1, the cleaning nozzle 104 includes a cleaning nozzle main body 1040, a guide cylinder 1041 is fixedly connected in the cleaning nozzle main body 1040, a pneumatic piston 1042 is slidably connected in the guide cylinder 1041, a reset elastic piece 1043 is sleeved on the pneumatic piston 1042, and one end of the pneumatic piston 1042 is fixedly connected with a sealing plug 1044, an other end of the pneumatic piston 1042 is fixedly connected with an ejector rod 1045, the guide cylinder 1041 is provided with a plurality of pressurized through holes 1046, and an output end of the cleaning nozzle main body 1040 is fixedly connected with a rubber folding piece 1047, one end, away from the pneumatic piston 1042, of the ejector rod 1045 is fixedly connected to the rubber folding piece 1047.

The working principle and beneficial effects of the above technical scheme are as follows: compressed air of the air compressor 102 enters the cleaning nozzle 104 through the threaded connecting pipe 103, and under the action of air pressure, the pneumatic piston 1042 slides along the direction that the guide cylinder 1041 is close to the rubber folding piece 1047, so that a gap is formed between the sealing plug 1044 and the inner wall of the cleaning nozzle main body 1040. Compressed air passes through the gap in turn and enters the guide cylinder 1041 through the pressurized through hole 1046 to realize re-pressurization. Because the pneumatic piston 1042 slides along the direction of the guide cylinder 1041 close to the rubber folding piece 1047, the ejector rod 1045 pushes the rubber folding piece 1047 apart. At this time, the compressed air rushes to the blade surface through the through hole on the rubber folding piece 1047 and air pressure is used to clean up the dust remaining on the blade surface.

Embodiment 5

On the basis of Embodiment 1, he intelligent cleaning disks 2 are fixedly connected with a height adjusting piece 200, and one end, away from the intelligent cleaning disks 2, of the height adjusting piece 200 is rotatably connected to the bottom of the main body plate frame 1;

each of the intelligent cleaning disks 2 includes a cleaning disk shell 201, where a second vision sensor is installed on the cleaning disk shell 201, a universal wheel 202 and two symmetrically arranged auxiliary wheels 203 are installed at a bottom of the cleaning disk shell 201, and a centralized brush head 204 and a collection brush head 204 are rotatably connected to the bottom of the cleaning disk shell 201, the collection brush head 205 is rotatably connected in a collection cavity 206.

The working principle and beneficial effects of the above technical scheme are as follows: the intelligent cleaning disk 2 can sweep the surface of the blade when the dust cleaning device is travelling. when in use, the dust cleaning device stays in a certain area, the universal wheel 202 and the two symmetrically arranged auxiliary wheels 203 can be designed to ensure the intelligent rotation under the action of the visual sensor, so that the positions of the collection brush head 205 and the centralized brush head 204 can be intelligently regulated and controlled within a certain range, and the efficient dust cleaning of the blade is realized. The centralized brush head 204 is used for dust accumulation and the collection brush head 205 is used for dust collection.

Embodiment 6

On the basis of Embodiment 1, the blade dustproof maintenance assembly 3 includes a dustproof maintenance driving motor 300, the dustproof maintenance driving motor 300 is fixedly connected to the bottom of the main body plate frame 1, two output ends of the dustproof maintenance driving motor 300 are fixedly connected with a first bevel gear 3000 and a second bevel gear 3001 respectively, and two symmetrically arranged first dustproof maintenance lead screws 3002 are rotatably connected in the main body plate frame 1; a third bevel gear 3003 is fixedly connected to each of the first dustproof maintenance lead screws 3002, and the third bevel gear 3003 and the first bevel gear 3000 are meshed with each other; each of the first dustproof maintenance lead screws 3002 is threadedly connected with a shifting nut 3004, and the shifting nut 3004 is fixedly connected with a wedge-shaped block 3006; abutting rods 3007 are slidably connected in the main body plate frame 1, the main body plate frame 1 is rotatably connected with hollow swing rods 3008, one end of each of the abutting rods 3007 abuts against the wedge-shaped block 3006, and an other end of each of the abutting rods 3007 is hinged with a linkage slider 3005, the linkage slider 3005 is slidably connected with each of the hollow swing rods 3008, and each of the abutting rods 3007 is connected with the main body plate frame 1 through a connecting elastic piece 3009;

two symmetrically arranged second dustproof maintenance lead screws 301 are rotatably connected in the main body plate frame 1, and a fourth bevel gear 3010 is fixedly connected to each of the second dustproof maintenance lead screws 301, and the fourth bevel gear 3010 and the second bevel gear 3001 are meshed with each other, and one end, away from the fourth bevel gear 3010, of each of the second dustproof maintenance lead screws 301 is located in a dustproof maintenance liquid extrusion cavity 3011, each of the second dustproof maintenance lead screws 301 is threadedly connected with an extrusion piston 3012, and an outlet end of the dustproof maintenance liquid extrusion cavity 3011 is communicated with each of the hollow swing rods 3008 through a hose 3013, a retractable sponge layer 3014 is installed on each of the hollow swing rods 3008.

The working principle and beneficial effects of the above technical scheme are as follows: when working, the dustproof maintenance driving motor 300 rotates to drive the first bevel gear 3000 and the second bevel gear 3001 to rotate, the first bevel gear 3000 rotates to drive the first dustproof maintenance lead screw 3002 to rotate, the first dustproof maintenance lead screw 3002 rotates to drive the shifting nut 3004 to move, and the shifting nut 3004 moves to drive the wedge-shaped block 3006 to move. The movement of the wedge block 3006 drives the abutting rod 3007 to move left and right, and the left and right movement of the abutting rod 3007 drives the hollow swing rod 3008 to swing back and forth. At the same time, the retractable sponge layer 3014 extends outward to contact with the blade surface. Meanwhile, the rotation of the second bevel gear 3001 drives the fourth bevel gear 3010 to rotate, and the rotation of the fourth bevel gear 3010 drives the second dustproof maintenance lead screw 301 to rotate. The rotation of the dustproof maintenance lead screw 301 drives the extrusion piston 3012 to move under the action of the thread, and the extrusion piston 3012 moves to extrude the dustproof maintenance liquid extrusion cavity 3011, so that the dustproof maintenance liquid in the dustproof maintenance liquid extrusion cavity 3011 is extruded into the retractable sponge layer 3014 through the hose 3013 and the hollow swing rod 3008, and then smeared on the blades through the retractable sponge layer 3014.

Embodiment 7

On the basis of Embodiment 1, a negative pressure fan, an airflow channel, a filtering assembly and an impurity removing assembly are arranged in each of the negative pressure soft rubber suction wheels 101, the filtering assembly and the impurity removing assembly are arranged in the airflow channel, the negative pressure fan is used for generating negative pressure, the filtering assembly is used for filtering dust impurities in airflow, and the impurity removing assembly is used for discharging filtered dust impurities, and air flows along the airflow channel under an action of the negative pressure fan to form a negative pressure circulating airflow to ensure the negative pressure soft rubber suction wheels 101 stably travelling on blades.

The device further includes a negative pressure soft rubber suction wheel control system, where the negative pressure soft rubber suction wheel control system is used for controlling the negative pressure soft rubber suction wheels 101 to work, and the negative pressure soft rubber suction wheel control system includes:
- a density sensor, where the density sensor is arranged in the airflow channel and is used for detecting density of dust impurities in the airflow channel;
- a flow rate sensor, where the flow rate sensor is arranged in the airflow channel and is used for detecting flow rate of airflow in the airflow channel;
- a flow sensor, where the flow sensor is arranged in the airflow channel and is used for detecting flow of airflow in the airflow channel;
- an angular velocity sensor, where the angular velocity sensor is arranged on the negative pressure fan and is used for detecting angular velocity of the negative pressure fan;
- a control unit and a blocking alarm unit, where the control unit is electrically connected with the density sensor, the flow rate sensor, the flow sensor, the angular velocity sensor, the negative pressure fan and the blocking alarm unit, and the control unit controls rotation speed of the negative pressure fan and operation of the blocking alarm unit based on the density sensor, the flow rate sensor, the flow sensor and the angular velocity sensor, including following steps:

step 1: based on the density sensor, the flow rate sensor and the flow sensor, a real-time blocking degree coefficient of the airflow channel is calculated:

$$\beta = \frac{\sum_{i=1}^{\frac{t}{T}} \gamma_i * \vartheta^2 * A}{F_0 |P_1 - P_2|^{\frac{L}{D}}} \varphi * \alpha, \tag{1}$$

where β is the real-time blocking degree coefficient of the airflow channel, $\gamma_i$ represents a detection value of the density sensor in i-th density detection period, t represents a total working time, T represents a density detection period, $\vartheta$ is a detection value of the flow rate sensor, A is an inner wall area of the airflow channel, L is a channel length of the airflow channel, D is an average diameter of the airflow channel, $F_0$ is a reference resistance of the airflow channel, $P_1$ represents an inlet air pressure of the airflow channel, $P_2$ represents an outlet air pressure of the airflow channel, φ is a detection value of the flow sensor and a is a flow resistance of the filtering assembly;

step 2: angular velocity of the negative pressure fan at j-th moment is calculated based on step 1, the angular velocity sensor and formula (2):

$$\omega_j = \frac{\omega_{j-1} \beta \left[ \left( \frac{P_1}{P_2} \right)^{\frac{m}{m-1}} - 1 \right]}{\eta}, \tag{2}$$

where, $\omega_j$ is an angular velocity of the negative pressure fan at j-th moment, m is a variable index of the negative pressure fan, $\omega_{j-1}$ is an angular velocity of the negative pressure fan at j−1-th moment, and η is a variable efficiency of the negative pressure fan;

step 3: the real-time blocking degree coefficient of the airflow channel is compared with a reference blocking degree coefficient of the airflow channel by the control unit, where if the real-time blocking degree coefficient of the airflow channel is greater than the reference blocking degree coefficient of the airflow channel, the control unit controls the blocking alarm unit to give an alarm, and the impurity removing assembly is started to remove impurities, and meanwhile, the controller performs real-time regulation and control on acceleration of the negative pressure fan based on the angular velocity of the negative pressure fan at j-th moment.

The working principle and beneficial effects of the above technical scheme are as follows: when the negative pressure soft rubber suction wheel 101 works, the negative pressure circulating airflow is formed by making the airflow flow along the airflow channel, so that the negative pressure soft rubber suction wheel 101 is attached to the surface of the blade and travels on the blade; when the filtering assembly is used for filtering dust impurities in the airflow, the impurity removing assembly is used for discharging the dust impurities obtained by filtering;

The design of the negative pressure soft rubber suction wheel control system can adjust and control the angular velocity of the negative pressure fan in real time to ensure the attachment between the negative pressure soft rubber suction wheel 101 and the blades. When calculating the angular velocity of the negative pressure fan at the j-th moment, the real-time blocking degree coefficient of the airflow channel is considered, so that the calculation result is more accurate. At the same time, when the real-time blocking degree coefficient of the airflow channel is greater than the reference blocking degree coefficient of the airflow channel, the control unit controls the blocking alarm unit to give an alarm, and at this time, the impurity removing assembly is started to remove impurities, so that the dust and impurities in the filtering assembly can be treated in time, and the working reliability of the negative pressure soft rubber suction wheel 101 can be effectively guaranteed.

Obviously, those skilled in the art can make various modifications and variations to the disclosure without departing from the spirit and scope of the disclosure. Thus, provided that these modifications and variations of the disclosure are within the scope of the claims of the disclosure and their equivalents, it is intend that the disclosure also includes these modifications and variation.

What is claimed is:

1. A dust cleaning device for wind turbine blades, comprising a main body plate frame, wherein suction wheel mounting frames are installed on both sides of a bottom of the main body plate frame, negative pressure soft rubber suction wheels are installed on each of the suction wheel mounting frames, and the main body plate frame is provided with a first vision sensor and the first vision sensor is electrically connected with each of the negative pressure soft rubber suction wheels, an air compressor is installed on the main body plate frame, a front side of the main body plate frame is installed with a plurality of threaded connecting pipes, the threaded connecting pipes are used for connecting with a cleaning nozzle, one end, away from the cleaning nozzle, of each of the threaded connecting pipes is communicated with an output end of the air compressor, a plurality of intelligent cleaning disks and a blade dustproof maintenance assembly are installed at the bottom of the main body plate frame, and an intelligent mechanical arm is installed at a top of the main body plate frame;

a working end of the intelligent mechanical arm is provided with a preliminary surface cleaning assembly, the preliminary surface cleaning assembly is used for preliminary dust cleaning for wind turbine blades;

the preliminary surface cleaning assembly comprises a dust suction pipe, wherein a dust suction head is arranged at an inlet of the dust suction pipe, a negative pressure fan is arranged at an outlet of the dust suction pipe, and a middle of the dust suction pipe is threadedly connected with a first storage bin and a funnel in turn along a dust inlet direction; a first filter screen is fixedly connected on an inner wall, above the first storage bin, of the dust suction pipe, and a second filter screen is fixedly connected at one end, close to the negative pressure fan, in the dust suction pipe; a bottom of the funnel is threadedly connected with a temporary storage pipe, the temporary storage pipe is provided with a manipulator groove, and a second storage bin is fixedly connected below the temporary storage pipe;

the second storage bin is fixedly connected with an extrusion cylinder, an output end of the extrusion cylinder is fixedly connected with an extrusion plate, the second storage bin is fixedly connected with two symmetrically arranged cover opening control cylinders, and an output end of each of the cover opening control cylinders is fixedly connected with a cover opening;

the blade dustproof maintenance assembly comprises a dustproof maintenance driving motor, the dustproof maintenance driving motor is fixedly connected to the bottom of the main body plate frame, two output ends of the dustproof maintenance driving motor are fixedly connected with a first bevel gear and a second bevel gear respectively, and two symmetrically arranged first dustproof maintenance lead screws are rotatably connected in the main body plate frame; a third bevel gear is fixedly connected to each of the first dustproof maintenance lead screws, and the third bevel gear and the first bevel gear are meshed with each other; each of the first dustproof maintenance lead screws is threadedly connected with a shifting nut, and the shifting nut is fixedly connected with a wedge-shaped block; abutting rods are slidably connected in the main body plate frame, the main body plate frame is rotatably connected with hollow swing rods, one end of each of the abutting rods abuts against the wedge-shaped block, and an other end of each of the abutting rods is hinged with a linkage slider, the linkage slider is slidably connected with each of the hollow swing rods, and each of the abutting rods is connected with the main body plate frame through a connecting elastic piece;

two symmetrically arranged second dustproof maintenance lead screws are rotatably connected in the main body plate frame, and a fourth bevel gear is fixedly connected to each of the second dustproof maintenance lead screws, and the fourth bevel gear and the second bevel gear are meshed with each other, and one end, away from the fourth bevel gear, of each of the second dustproof maintenance lead screws is located in a dustproof maintenance liquid extrusion cavity, each of the second dustproof maintenance lead screws is threadedly connected with an extrusion piston, and an outlet end of the dustproof maintenance liquid extrusion cavity is communicated with each of the hollow swing rods through a hose, a retractable sponge layer is installed on each of the hollow swing rods.

2. The dust cleaning device for wind turbine blades according to claim 1, wherein a temporary storage assembly is arranged in the temporary storage pipe, and the temporary storage assembly comprises an electric baffle and a limit block, wherein the electric baffle is rotatably connected to an inner wall of the temporary storage pipe, and the limit block is fixedly connected to the inner wall of the temporary storage pipe; the electric baffle is provided with a pressure sensor, a timer and a controller, an abutting cylinder is arranged in the electric baffle, and the controller is electrically connected with the pressure sensor, the timer, the electric baffle and the abutting cylinder;

wherein when $F_1 < F_S \le F_2$, the abutting cylinder is in an extended state, and a plane of the electric baffle is in a state perpendicular to an axis of the temporary storage pipe;

when $F_S > F_2$, the abutting cylinder is shortened, and the plane of the electric baffle is simultaneously triggered to rotate to a state parallel to the axis of the temporary storage pipe, and the electric baffle is reset after staying for a preset time;

wherein $F_1$ is a first pressure threshold, $F_2$ is a second pressure threshold, $F_S$ is a detection value of the pressure sensor, and the preset time is a timing value of the timer.

3. The dust cleaning device for wind turbine blades according to claim 1, wherein the cleaning nozzle comprises a cleaning nozzle main body, a guide cylinder is fixedly connected in the cleaning nozzle main body, a pneumatic piston is slidably connected in the guide cylinder, a reset elastic piece is sleeved on the pneumatic piston, and one end of the pneumatic piston is fixedly connected with a sealing plug, an other end of the pneumatic piston is fixedly connected with an ejector rod, the guide cylinder is provided with a plurality of pressurized through holes, and an output end of the cleaning nozzle main body is fixedly connected with a rubber folding piece, one end, away from the pneumatic piston, of the ejector rod is fixedly connected to the rubber folding piece.

4. The dust cleaning device for wind turbine blades according to claim 1, wherein the intelligent cleaning disks are fixedly connected with a height adjusting piece, and one end, away from the intelligent cleaning disks, of the height adjusting piece is rotatably connected to the bottom of the main body plate frame;
   each of the intelligent cleaning disks comprises a cleaning disk shell, wherein a second vision sensor is installed on the cleaning disk shell, a universal wheel and two symmetrically arranged auxiliary wheels are installed at a bottom of the cleaning disk shell, and a centralized brush head and a collection brush head are rotatably connected to the bottom of the cleaning disk shell, the collection brush head is rotatably connected in a collection cavity.

5. The dust cleaning device for wind turbine blades according to claim 1, wherein the main body plate frame is bolted with a spare part storage box, the spare part storage box is used for storing spare parts.

6. The dust cleaning device for wind turbine blades according to claim 1, wherein a negative pressure fan, an airflow channel, a filtering assembly and an impurity removing assembly are arranged in each of the negative pressure soft rubber suction wheels, the filtering assembly and the impurity removing assembly are arranged in the airflow channel, the negative pressure fan is used for generating negative pressure, the filtering assembly is used for filtering dust impurities in airflow, and the impurity removing assembly is used for discharging filtered dust impurities, and air flows along the airflow channel under an action of the negative pressure fan to form a negative pressure circulating airflow to ensure the negative pressure soft rubber suction wheels stably travelling on blades.

7. The dust cleaning device for wind turbine blades according to claim 6, further comprising a negative pressure soft rubber suction wheel control system, wherein the negative pressure soft rubber suction wheel control system is used for controlling the negative pressure soft rubber suction wheels to work, and the negative pressure soft rubber suction wheel control system comprises:
   a density sensor, wherein the density sensor is arranged in the airflow channel and is used for detecting density of dust impurities in the airflow channel;
   a flow rate sensor, wherein the flow rate sensor is arranged in the airflow channel and is used for detecting flow rate of airflow in the airflow channel;
   a flow sensor, wherein the flow sensor is arranged in the airflow channel and is used for detecting flow of airflow in the airflow channel;
   an angular velocity sensor, wherein the angular velocity sensor is arranged on the negative pressure fan and is used for detecting angular velocity of the negative pressure fan;
   a control unit and a blocking alarm unit, wherein the control unit is electrically connected with the density sensor, the flow rate sensor, the flow sensor, the angular velocity sensor, the negative pressure fan and the blocking alarm unit, and the control unit controls rotation speed of the negative pressure fan and operation of the blocking alarm unit based on the density sensor, the flow rate sensor, the flow sensor and the angular velocity sensor, comprising following steps:
   step 1: based on the density sensor, the flow rate sensor and the flow sensor, calculating a real-time blocking degree coefficient of the airflow channel:

$$\beta = \frac{\sum_{i=1}^{\frac{t}{T}} \gamma_i * \vartheta^2 * A}{F_0 |P_1 - P_2|^{\frac{L}{D}}} \varphi * \alpha \tag{1}$$

wherein β is the real-time blocking degree coefficient of the airflow channel, $\gamma_i$ represents a detection value of the density sensor in i-th density detection period, t represents a total working time, T represents a density detection period, $\vartheta$ is a detection value of the flow rate sensor, A is an inner wall area of the airflow channel, L is a channel length of the airflow channel, D is an average diameter of the airflow channel, $F_0$ is a reference resistance of the airflow channel, $P_1$ represents an inlet air pressure of the airflow channel, $P_2$ represents an outlet air pressure of the airflow channel, φ is a detection value of the flow sensor and a is a flow resistance of the filtering assembly;
   step 2: calculating angular velocity of the negative pressure fan at j-th moment based on step 1, the angular velocity sensor and formula (2):

$$\omega_j = \frac{\omega_{j-1} \beta \left[ \left( \frac{P_1}{P_2} \right)^{\frac{m}{m-1}} - 1 \right]}{\eta} \tag{2}$$

wherein, $\omega_j$ is an angular velocity of the negative pressure fan at j-th moment, m is a variable index of the negative pressure fan, $\omega_{j-1}$ is an angular velocity of the negative pressure fan at j−1-th moment, and η is a variable efficiency of the negative pressure fan;
   step 3: comparing the real-time blocking degree coefficient of the airflow channel with a reference blocking degree coefficient of the airflow channel by the control unit, wherein if the real-time blocking degree coefficient of the airflow channel is greater than the reference blocking degree coefficient of the airflow channel, the control unit controls the blocking alarm unit to give an alarm, and the impurity removing assembly is started to remove impurities, and meanwhile, the controller performs real-time regulation and control on acceleration of the negative pressure fan based on the angular velocity of the negative pressure fan at j-th moment.

\* \* \* \* \*